United States Patent
Han et al.

(10) Patent No.: US 9,709,832 B2
(45) Date of Patent: Jul. 18, 2017

(54) ELECTRO-OPTICAL SINGLE CRYSTAL ELEMENT, METHOD FOR THE PREPARATION THEREOF, AND SYSTEMS EMPLOYING THE SAME

(71) Applicant: Pengdi Han, Napierville, IL (US)

(72) Inventors: Pengdi Han, Napierville, IL (US); Welling Yan, Woodridge, IL (US)

(73) Assignee: PENGDI HAN, Napierville, IL (US)

( * ) Notice: Subject to any disclaimer, the term of this patent is extended or adjusted under 35 U.S.C. 154(b) by 0 days.

(21) Appl. No.: 15/006,762

(22) Filed: Jan. 26, 2016

(65) Prior Publication Data

US 2016/0139436 A1 May 19, 2016

Related U.S. Application Data

(63) Continuation of application No. 14/390,522, filed as application No. PCT/US2013/035343 on Apr. 4, 2013, now Pat. No. 9,280,006.

(Continued)

(51) Int. Cl.
*G02F 1/05* (2006.01)
*G02F 1/055* (2006.01)
(Continued)

(52) U.S. Cl.
CPC ........ *G02F 1/055* (2013.01); *B29D 11/00932* (2013.01); *G02F 1/0027* (2013.01);
(Continued)

(58) Field of Classification Search
CPC .......... G02F 1/05; G02F 1/055; G02F 1/3558; G02F 1/0027; G02F 1/0136; G02F 1/21; G02F 2001/212; B29D 11/00932
(Continued)

(56) References Cited

U.S. PATENT DOCUMENTS 5,998,910 A 12/1999 Park et al.
6,597,492 B1 * 7/2003 Rosenman .............. C30B 30/00
117/2

(Continued)

FOREIGN PATENT DOCUMENTS

CA 2869688 11/2016
EP 1479796 11/2004
(Continued)

OTHER PUBLICATIONS

PCT/US2013/035343, International Search Report mailed Jul. 9, 2013, 2 pages—English.

(Continued)

*Primary Examiner* — William R Alexander
(74) *Attorney, Agent, or Firm* — Andrew F. Young, Esq.; Lackenbach Siegel, LLP

(57) ABSTRACT

The present invention relates to an Electro-Optical (E-O) crystal elements, their applications and the processes for the preparation thereof. More specifically, the present invention relates to the E-O crystal elements (which can be made from doped or un-doped PMN-PT, PIN-PMN-PT or PZN-PT ferroelectric crystals) showing super-high linear E-O coefficient $\gamma_c$, e.g., transverse effective linear E-O coefficient $\gamma^T_c$ more than 1100 pm/V and longitudinal effective linear E-O coefficient $\gamma^l_c$ up to 527 pm/V, which results in a very low half-wavelength voltage $V^l_\pi$ below 200V and $V^T_\pi$ below about 87V in a wide number of modulation, communication, laser, and industrial uses.

8 Claims, 6 Drawing Sheets

Related U.S. Application Data

(60) Provisional application No. 61/686,350, filed on Apr. 4, 2012, provisional application No. 61/802,796, filed on Mar. 18, 2013.

(51) Int. Cl.
    *G02F 1/355*     (2006.01)
    *G02F 1/00*     (2006.01)
    *B29D 11/00*     (2006.01)
    *G02F 1/01*     (2006.01)
    *G02F 1/21*     (2006.01)

(52) U.S. Cl.
    CPC ............ *G02F 1/0136* (2013.01); *G02F 1/05* (2013.01); *G02F 1/21* (2013.01); *G02F 1/3558* (2013.01); *G02F 2001/212* (2013.01)

(58) Field of Classification Search
    USPC ................................................ 359/238, 252
    See application file for complete search history.

(56) References Cited

U.S. PATENT DOCUMENTS

| | | | |
|---|---|---|---|
| 6,890,874 B1 * | 5/2005 | Li | C04B 35/495 252/62.9 PZ |
| 2003/0031400 A1 | 2/2003 | Pruneri | |
| 2005/0162595 A1 * | 7/2005 | Kondo | G02F 1/055 349/124 |
| 2008/0151358 A1 * | 6/2008 | Jiang | H01S 3/16 359/323 |
| 2009/0212667 A1 | 8/2009 | Matsushita | |
| 2010/0245985 A1 * | 9/2010 | Yoshino | G02F 1/3558 359/326 |
| 2011/0228375 A1 | 9/2011 | Desai | |
| 2015/0211146 A1 * | 7/2015 | Jiang | C30B 11/003 117/3 |

FOREIGN PATENT DOCUMENTS

| | | |
|---|---|---|
| JP | 2001-313997 | 11/2001 |
| JP | 2003-270602 | 9/2003 |
| JP | 2005-119944 | 5/2005 |
| JP | 2005-322673 | 11/2005 |
| JP | 2007-108515 | 4/2007 |
| WO | WO2011/098130 | 8/2011 |

OTHER PUBLICATIONS

PCT/US2013/035343, Written Opinion of the ISR dated Jul. 9, 2013, 8 pages—English.

EPC 13772275.7, European Search Report dated Oct. 6, 2015, 8 pages—English.

Elastic, piezoelectric, and dielectric properties of multidomain $0.67Pb(Mg_{1/3}Nb_{frax;2;3})O_3$-$0.33PbTIO_3$ single crystals, Zhang, Jiang, Cao, published Jun. 11, 2001, Journal of Applied Physics, vol. 90, No. 7, dated Oct. 1, 2001, 2001 American Institute of Physics, 5 pages.

Canadian Pat. Appln. No. 2,869,688 mailed Feb. 17, 2016, 3 pages—English.

Quantum Electronics, Third Edition, California Institue of Technology, John Wiley & Sons, Copyright © 1967, 1975, 1989, Library of Congress, 693 pages.

Canadian Pat. Appln. Serial No. 2,869,688, Office Action dated Feb. 17, 2016, 3 pages—English.

JP 2015-504738 Office Action dated Jul. 4, 2016, 6 pages—Japanese; 5 pages—English.

Chuanwen Chen, et al., Orientation dependence of oucpling between Lamband shear horizontal waves in (1-x)Pb(Mg1/3Nb2/3)O3—xPbTiO3 single crystal plates, 2009 18th IEEE International Symposium on the Applications of Ferroelectrics, Aug. 23, 2009, pp. 1-4.

L.C. Lim, et al., Flux-grown PZN-PT Single Crystals for High-performance Piezo Devices, 2007 16th IEEE International Symposium on the Applications of Ferroelecrics, May 27, 2007 pp. 568-571.

Shujun Zhang, et al., Evaluation of PMN-PT based Crystals for Various Applications, 2011 International Symposium on Applications of Ferroelectrics and 2011, 2011 International Symposium on Piezoresponse Force Microscopy and Nanaoscale Phenomena in Polar Materials, Jul. 24, 2011, pp. 1-4.

\* cited by examiner

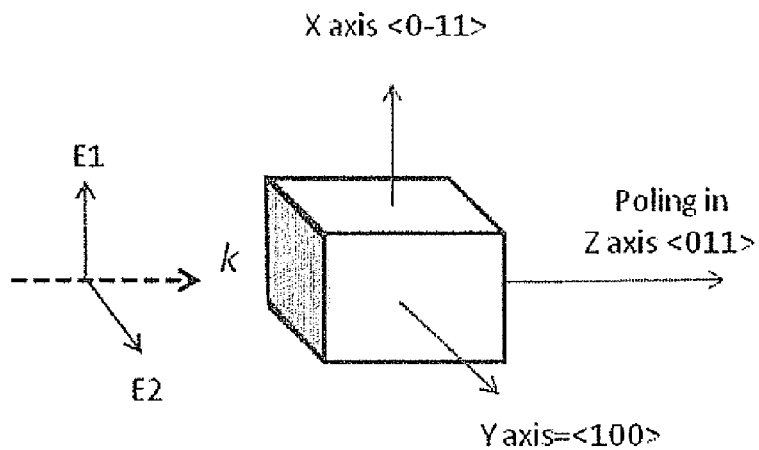
FIG. 3
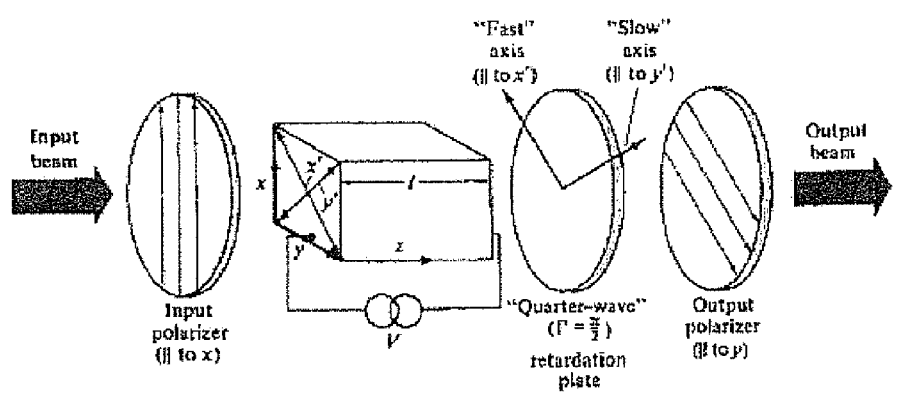
FIG. 3A
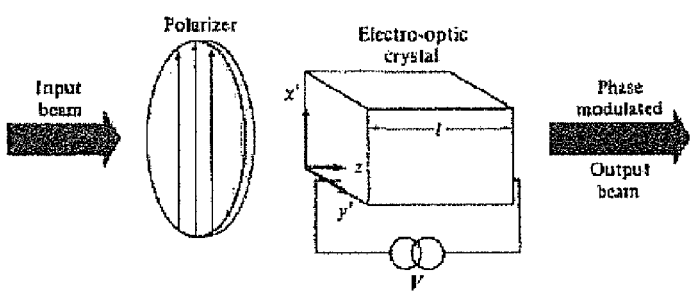
FIG. 3B

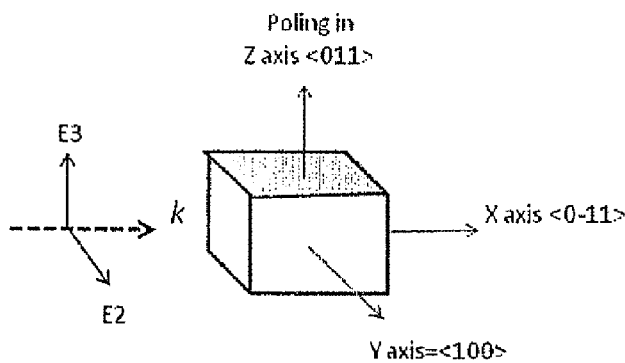
FIG. 4
FIG. 4A
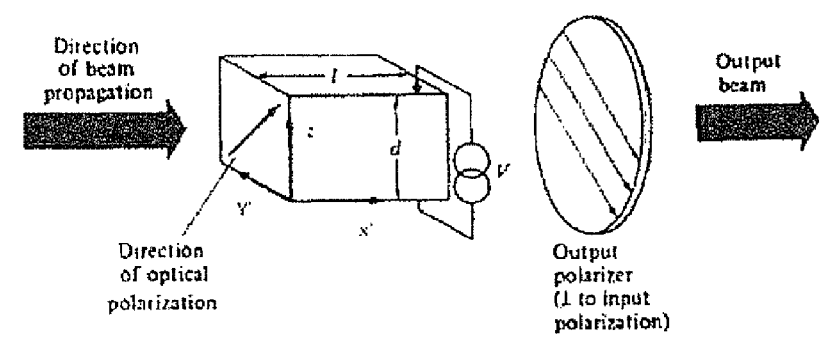
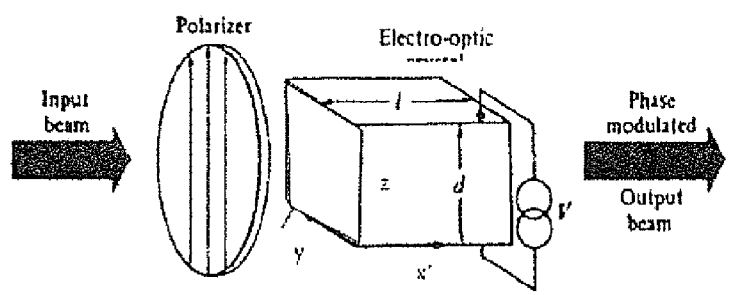
FIG. 4B

ELECTRO-OPTICAL SINGLE CRYSTAL ELEMENT, METHOD FOR THE PREPARATION THEREOF, AND SYSTEMS EMPLOYING THE SAME

CROSS REFERENCE TO RELATED APPLICATIONS

This application is a continuation of U.S. Ser. No. 14/390,522 filed Oct. 3, 2014 which in turn claims priority from Ser. No. PCT/US2013/035343 filed Apr. 4, 2013 which in turn claims priority from U.S. Prov. No. 61/686,350 filed Apr. 4, 2012, and U.S. Prov. Ser. No. 61/802,796 filed Mar. 18, 2013, the entire contents of each of which is fully incorporated herein by reference.

FIGURE SELECTED FOR PUBLICATION

FIG. 2A

BACKGROUND OF THE INVENTION

Field of the Invention

The present invention relates to the new type Electro-Optical (E-O) crystal elements, its applications and the processes for the preparation thereof. More specifically, the present invention relates to an E-O crystal element showing super-high effective (transverse and longitudinal) linear E-O coefficient and very low half-wave voltage V, useful in a wide number of modulation, communication, laser, and electro-optical industrial uses.

Description of the Related Art

Recently PMN-PT based ferroelectric relaxer crystals have been well developed because of its super-high piezoelectric properties such as electrical strains an order higher than conventional piezoelectric materials and the electro-mechanical coupling factor over 90%. These crystals have been used for piezoelectric applications, especially for acoustic transduction devices, such as ultrasound imaging and sonar transducers. The very anisotropic piezoelectric characteristics of <011> poled PMN-PT and/or PZN-PT based crystals have been well documented. These can be noted in Applicant's prior publications, the entire contents of which are incorporated herein fully by reference:

P. Han, W. L. Yan, J. Tian, X. L. Huang, and H. X. Pan. "Cut directions for the optimization of piezoelectric coefficients of lead magnesium niobate-lead titanate ferroelectric crystals". Discovery of d36 shear mode, Appl. Phys. Letter. 86, No. 1, 2466, (2005); and P. Han, J. Tian, and W. Yan, "Bridgman growth and properties of PMN-PT single crystals," in Advanced dielectric, piezoelectric and ferroelectric materials: Synthesis, characterization and applications, Z. G. Ye, Ed., 1st Ed: Woodhead Publishing Ltd., 2008, p. 600-632. (The summary of large-sized PMN-PT crystals growth by modified Bridgman method and characterizations).

The linear E-O effects of <001> poled and <111> poled PMN-PT and PZN-PT ferroelectric crystals above have been reported, but the results were not encouraged or promoted as inoperative for commercial uses. These results were noted in the publications below, the entire contents of which are also incorporated herein fully by reference.

Yu Lu, Z. Y. Cheng, S. E. Park, S. F Liu and Q. M. "Zhang "linear Electro-Optic effect of 0.88Pb(Zn1/3Nb2/3)O3 single crystal", Jpn. J Appl. Phys Vol. 39 No. 1, January, 2000.

X. M. Wan, D. Y. Wang. X. Y. Zhao, Haosu Luo, H. L. W. Chan and C. L. Choy. "Electro-Optic characterization of tetragonal (1−x)Ob(Mg1/3Nb2/3)O3 single crystals by a method Senarmont Setup" Slid state communications Vol. 134 547-551 (2005).

L. S. Kamzina, Ruan Wei, G. Li. J. Zeng and A. Ding. "Electro-Optical properties of PMN-PT compounds: single crystals and transparent ferroelectric ceramics". Physics of solid state, Vol. 52. No. 10 2142-2146 (2010). (Original Russian text).

Enwei Sun, Zhu Wang, Rui Zhang and Wenwu Cao. "Reduction of electro-optic half-wave voltage of 0.93Pb(Zn1/3Nb2/3)3-0.07PbTiO3 single crystal through large piezoelectric strain". Optical Materials Vol. 33.m 549-552 (2011).

The major reason is the light scattering from multi-domain walls and the instability of <111> poled single domain status and that all the reported works were limited in optical uniaxial crystals of the PMN-PT or PZN-PT based solid solutions.

ASPECTS AND SUMMARY OF THE INVENTION

The present invention relates to E-O crystal elements of ultra-high effective E-O coefficient $\gamma_c$ and very low half-wave voltage $V_\pi$ in PMN-PT and PZN-PT based ferroelectric single crystal materials. The invention gives new E-O crystal elements and related E-O crystal devices with benefit merits including:

(1) superior E-O properties and extremely low half-wave voltage $V_\pi$, (2) broad operating temperature range from −30 C up to 110 C, (3) the high reliability by the re-poling capability, and (4) a cost effective preparation method.

The invention enables the commercially application of the invented E-O crystal elements in a variety of the E-O crystal devices as a new generation of E-O crystal elements. It is especially applicable to E-O switching, E-O phase modulation, E-O amplitude modulation, laser beam modulation and optical birefringence devices.

The present invention also relates to the new type Electro-Optical (E-O) crystal elements, its applications and the processes for the preparation thereof. More specifically, the present invention relates to an E-O crystal element showing high effective transverse and longitudinal linear E-O coefficient and very low half-wave voltage V, useful in a wide number of modulation, communication, laser, and industrial uses.

The present invention also relates to an Electro-Optical (E-O) crystal element, (which can be made from doped or un-doped PMN-PT, PIN-PMN-PT or PZN-PT ferroelectric crystals) showing super-high linear E-O coefficient $\gamma_c$, e.g., transverse effective linear E-O coefficient $\gamma^T_c$ more than 1100 pm/V and longitudinal effective linear E-O coefficient $\gamma^l_c$ up to 527 pm/V, which results in a very low half-wavelength voltage $V^l_\pi$ below 200V and $V^T_\pi$ below 87V in a wide number of modulation, communication, laser, and industrial uses. The present invention also notes that the proposed crystal element is operative as a means for providing the results therein, stated differently, the proposed crystal elements are means for providing a transverse effective linear E-O coefficient $\gamma^T_c$ more than 1100 pm/V and longitudinal effective linear E-O coefficient $\gamma^l_c$ up to 527 pm/V, which results in a very low half-wavelength voltage $V^l_\pi$ below 200V and $V^T_\pi$ below 87V, in products, systems, and apparatus containing the same following operative configuration.

The E-O single crystal materials can be selected from PMN-PT (Lead Magnesium Niobate-Lead Titanate) or PIN-PMN-PT (Lead Indium niobate-Lead magnesium Niobate-Lead Titanate) or PZN-PT (Lead Zinc Niobate-Lead Titanate) or doped crystals above. The invention particularly relates to a repole-able design. i.e., applied electrical field parallel to the poling direction <011> in the crystals. The E-O crystal elements show (1) the effective transverse linear E-O coefficient $\gamma^T_c$, as high as the range of 350~1100 pm/V (operating temperature from −30 C to 85 C) and very low half-wavelength voltage $V^T_\pi$ less than 45 V (l/d=1), and (2) the effective longitudinal linear E-O coefficient $\gamma^l_c$ as high as in the range of 280~800 pm/V (operating temperature from −30 C to 110 C) with very low half-wave voltage $V^l_\pi$ less than 300V, and preferably less than about 200V, and more preferably less than about 150V. The ultra-high effective E-O coefficient $\gamma_c$ and very low $V_\pi$ in additional to the nature of re-poling capability enable the invented crystal elements to be used in a variety of the E-O devices as a new generation of E-O crystal elements. It is especially applicable to, but not limited to, E-O switching, E-O phase modulation, E-O amplitude modulation, laser beam modulation and optical birefringence devices.

In one aspect of the present invention the following example was provided as a transverse mode E-O crystal element as recited in claim 4 was tested in the configuration of transverse mode E-O amplitude modulation as recited in claim 12 (see FIG. 4A). The crystal composition is 67.5% PMN-32.5% PT, <011> poled to mm2 nano-domain symmetry. The optical beam wavelength is 633 nm. The results are repeatable, and:

$\gamma^T_c$: 1160 pm/V at 80 C, 527 pm/V at 20 C, 436 pm/V at −8 C, and 395 pm/V at −21 C $V^T_\pi$: 87.5 V at 80 C, 87.5 V at 20 C, 119 V-8 C. The $V^T_\pi$ data were normalized to ratio l/d=1.

where $\gamma^T_c$: (Transverse effective E-O coefficient); $V^T_\pi$:Transverse mode half-wave voltage.

According to one aspect of the present invention, there is provided a method of producing an electro-optical crystal element, comprising the steps of: preparing a ferroelectric crystal having a chemical composition represented by one of the chemical formulas:

(I) $Pb(Mg_{1/3}Nb_{2/3})_{1-x}Ti_xO_3$ where x is defined as 0.22 to 0.38 or (II) $Pb(Zn_{1/3}Nb_{2/3})_{1-y}Ti_yO_3$ where y is defined as 0.04 to 0.11, wherein, all the crystal elements can be doped or co-doped with Lanthanum (La) up to 6% (wt %), Antimony (Sb), Tantalum (Ta) up to 8% (wt %), Indium (In) up to 31% (wt %), Zirconium (Zr) up to 5% (wt %) and at least one rare earth element from the group consisting of: Cerium (Ce), Erbium (Er), Terbium (Tb), Scandium (Sc), and Neodymium (Nd), up to 8% (wt %), slicing the crystal element to (011) and forming wafers, and polarizing into a mm2-symmetric structure by poling the crystal element in <011> direction under 2 times of coercive field ($E_c$) in a temperature range below 95° C.

According to another aspect of the present invention, there is provided a method of producing an electro-optical crystal element, wherein: the step of polarizing results in one of a single domain and a multi-nano-domain structure.

According to another aspect of the present invention, there is provided a method of producing an electro-optical crystal element, further comprising the steps of: conducting a dicing of the prepared crystal element, and conducting a polishing and an optical finishing of the crystal element, thereby forming the electro-optical crystal element.

According to another aspect of the present invention, there is provided a method of producing an electro-optical crystal element, wherein: further comprising the steps of: electroding the crystal element.

According to another aspect of the present invention, there is provided a method of producing an electro-optical crystal element, wherein: providing a transverse mode crystal element, and the transverse mode crystal element providing <011> polarization and giving the transverse effective E-O coefficient $\gamma^T_c$ more than 527 pm/V and half-wave voltage $V^T_\pi$ less than 87.5 V (l/d=1) at room temperature 20° C.

According to another aspect of the present invention, there is provided a method of producing an electro-optical crystal element, wherein: providing a longitudinal mode crystal element, coating a transparent electrodes on the longitudinal mode crystal element, and the longitudinal mode crystal element providing <011> polarization of longitudinal effective E-O coefficient $\gamma^l_c$ more than 427 pm/V and $V^l_\pi$ less than 300 V at room temperature 20° C.

According to another aspect of the present invention, there is provided a method of producing an electro-optical crystal element, comprising the steps of: preparing a ferroelectric crystal having a chemical composition represented by the chemical formula:

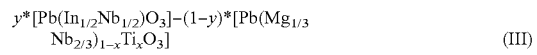

$$y^*[Pb(In_{1/2}Nb_{1/2})O_3]-(1-y)^*[Pb(Mg_{1/3}Nb_{2/3})_{1-x}Ti_xO_3] \qquad (III)$$

where x is defined as 0.0 to 0.35, y as 0.0 to 0.35 slicing the crystal element to (011) wafers, and polarizing into mm2 symmetric structure by poling the crystal element in <011> direction under 2 times of coercive field ($E_c$) in a temperature range below 95° C.

According to another aspect of the present invention, there is provided a method of producing an electro-optical crystal element, according to formula III, further comprising the steps of: providing a transverse mode crystal element, and the transverse mode crystal element providing <011> polarization and giving the transverse effective E-O coefficient $\gamma^T_c$ above 500 pm/V and half-wave voltage $V^T_\pi$ less than 12 V (l/d=7) at room temperature 20° C.

According to another aspect of the present invention, there is provided a method of producing an electro-optical crystal element, further comprising the steps of providing a longitudinal mode crystal element, coating a transparent electrode on the longitudinal mode crystal element, and the longitudinal mode crystal element providing <011> polarization of longitudinal effective E-O coefficient $\gamma^l_c$ above 427 pm/V and $V^l_\pi$ less than 300 V at room temperature 20° C.

According to another aspect of the present invention, there is provided an electro-optical system, the system being one of an amplitude modulator and a phase modulator, comprising: a longitudinal mode electro-optical crystal element produced by a method according to formula III, and the longitudinal mode electro-optical crystal element including means for providing <011> polarization of longitudinal effective E-O coefficient $\gamma^l_c$ above 427 pm/V and $V^l_\pi$ less than 300 V at room temperature 20° C.

According to another aspect of the present invention, there is provided an electro-optical system, the system being one of an amplitude modulator and a phase modulator, comprising: a transverse mode electro-optical crystal element produced by a method according to formulas I or II, and the transverse mode electro-optical crystal element including means for providing <011> polarization and giving the transverse effective E-O coefficient $\gamma^T_c$ above 500 pm/V and half-wave voltage $V^T_\pi$ less than 87.5 V (l/d=1) at room temperature 20° C.

According to another aspect of the present invention, there is provided an electro-optical system, the system being one of an amplitude modulator and a phase modulator, comprising: a transverse mode electro-optical crystal element produced by a method acceding to formula III, and the transverse mode electro-optical crystal element including means for providing <011> polarization and giving the transverse effective E-O coefficient $\gamma^T_c$ above 500 pm/V and half-wave voltage $V^T_\pi$ less than 12 V (l/d=7) at room temperature 20° C.

According to another aspect of the present invention, there is provided an electro-optical modulator system for laser beams, comprising: a Mach-Zehnder-type interferometer modulator on an (011) surface of an optical electrical crystal element, and the optical electrical crystal element produced by a method according to one of formulas I, II, and III.

The above and other optional and adaptive aspects, features and advantages of the present invention will become apparent from the following description read in conjunction with the accompanying drawings, in which like reference numerals designate the same elements.

BRIEF DESCRIPTION OF THE DRAWINGS

FIG. 3 is an E-O crystal wafer, diced, polished, and optically finished into an E-O crystal element (cell), as noted.

FIG. 3A is a longitudinal mode E-O amplitude modulator system using <011> poled E-O crystal element as noted herein.

FIG. 3B is a longitudinal mode E-O phase modulator system using <011> poled E-O crystal element as noted herein.

FIG. 4 is an E-O crystal wafer, diced, polished, and optically finished into an E-O crystal element (cell), as noted.

FIG. 4A is a transverse mode E-O amplitude modulator using <011> poled E-O crystal element as noted herein.

FIG. 4B is a transverse mode E-O phase modulator using <011> poled E-O crystal element as noted herein.

DETAILED DESCRIPTION OF THE PREFERRED EMBODIMENTS

Figure 1:
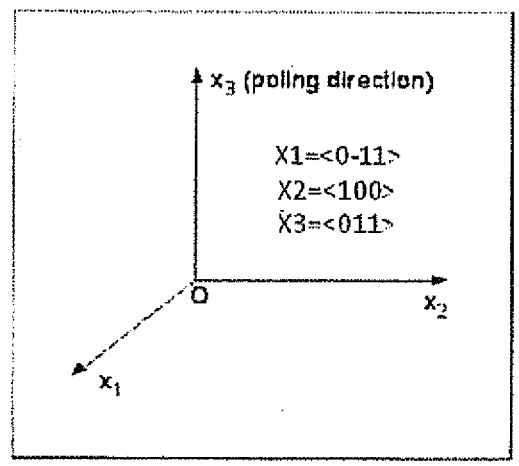
FIG. 1 is the anisotropic surface of piezoelectric coefficient $d_{31}$ of <011> poled E-O crystal.
Figure 1A:
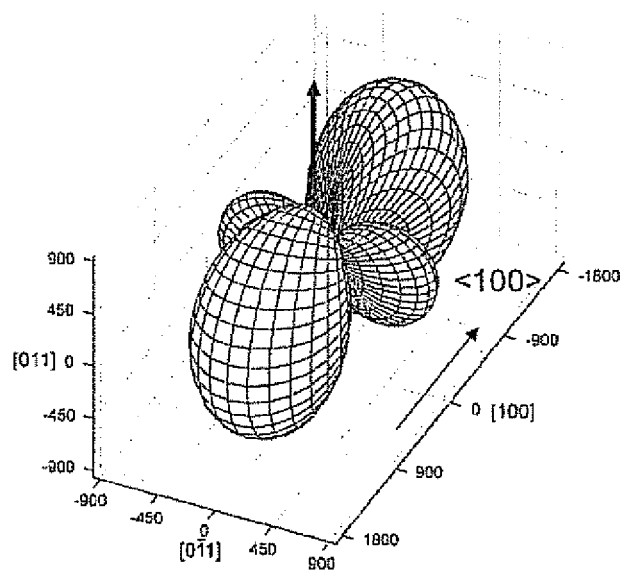
FIG. 1A is a 3D plot of the anisotropic surface of piezoelectric coefficient $d_{31}$ for a <011> poled E-O crystal of FIG. 1.

Reference will now be made in detail to aspects of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

The present invention provides an Electro-Optical (E-O) crystal element, applications and the processes for the preparation thereof, including the use of the same in further systems, lasers, and modulators, as will be discussed.

More specifically, the present invention relates to an E-O crystal element showing high effective transverse and longitudinal linear E-O coefficient and very low half-wavelength voltage $V_\pi$ useful in a wide number of modulation, communication, laser, and industrial uses.

The ferroelectric single crystal materials can be PMN-PT (Lead Magnesium Niobate-Lead Titanate) or PIN-PMN-PT (Lead Indium niobate-Lead magnesium Niobate-Lead Titanate) or PZN-PT (Lead Zinc Niobate-Lead Titanate) and/or doped crystals above. The invention particularly relates to a repole-able design <011>-poled (cubic notation) ferroelectric crystals mentioned above. The optical transmittance of the poled crystals is transparent from 0.41 μm continues into the IR region at least through 5 μm without any noticeable absorption bands. The E-O crystals give super-high effective/apparent electro-optic coefficient $\gamma_c/\gamma^*_c$, and revy low half-wave voltage below 87 V. This <011> repole-able characteristic is strategically important for the practical applications in terms of reliability and convenience for uses. Another merit of the repole-able configuration is the low cost for the fabrication of E-O crystal elements. We have discovered that, the <011>-poled E-O crystal elements show (1) the effective transverse linear E-O coefficient $\gamma^T_c$ as high as the range of 350~1100 pm/V (operating temperature from −30 C to 110 C) and very low half-wave voltage $V^T_\pi$ less than 85 V (l/d=1) and less than 12V (l/d=7), and (2) the effective longitudinal linear E-O coefficient $\gamma^l_c$ as high as in the range of 280~800 pm/V (operating temperature from −30 C to 110 C) with very low half-wave voltage $V^l_\pi$ less than 315V. The ultra-high effective E-O coefficient $\gamma_c$ and very low $V_\pi$ in additional to the nature of re-poling capability enable the invented crystal elements to be used in a variety of the E-O devices as a new generation of E-O crystal elements. It is especially applicable to E-O switching, E-O phase modulation. E-O amplitude modulation, laser beam modulation, tunable filter and optical birefringence devices.

more chances for higher linear E-O responses. No reports have provided an E-O effect on biaxial optical crystals of PMN-PT or PZN-PT based solid solutions. Thus, we selected from and focused at the <011> cut and poled crystals above with optical bi-axes for the linear E-O effect.

Note: <001> poling results in 4 mm symmetric multi-domain structure and property and <111> poling results in 3 m symmetric single domain and property, both must be optical uniaxial, whereas the <011> poling must result in optical biaxial status this is a substantial difference that must be recognized and has not been in the art.

Table 1 gives a list of commercial E-O crystals

| E-O Crystal | Apparent $\gamma_c$* | Major tensors contributing to $\gamma_c$ | $V^T_{\pi(l=d)}$ V | $V^l_\pi$ V | Symmetry | λ μm | Optical axis |
|---|---|---|---|---|---|---|---|
| ADP (NH$_4$H$_2$PO$_4$) | 8.5 | $\gamma_{63}$ | 9,000 | 6800 | 42 m | 0.546 | uniaxial |
| KDP (KH$_2$PO$_4$) | 10.5 | $\gamma_{63}$ | 17,600 | 8800 | 42 m | 0.546 | uniaxial |
| LiNO$_3$ | 31 | $\gamma_{33}$ | 3,030 | 5,300 | 3 m | 0.633 | uniaxial |
| BNN Ba$_2$Na$_a$Nb$_5$O$_{15}$ | 350 | $\gamma_{33}$ | 1,570 | 1,100 | mm2 | 0.633 | biaxial |
| KTP (KTiOPO$_4$) | 35 | $\gamma_{33}$ | | | mm2 | 0.633 | biaxial |
| KNbO$_3$ | 64 | $\gamma_{33}$ | | | mm2 | 0.633 | biaxial |

$\gamma_c$ Effective E-O coefficient, pm/V
$\gamma_c$* Apparent E-O coefficient, pm/V, piezoelectric effect compensated $\gamma_c$.
$V^l_\pi$ Longitudinal half-wave voltage
$V^T_{\pi(l=d)}$ Transverse half-wave voltage (normalized to l = d)

TABLE 2

Extremely low half-wave voltage $V_\pi$ of E-O crystals of the invention.

| E-O Crystal | Apparent $\gamma_c$* | Major tensors contributing to $\gamma_c$ | $V^T_{\pi(l=d)}$ V | $V^l_\pi$ V | Symmetry | λ μm | Optical axis |
|---|---|---|---|---|---|---|---|
| PMN-PT* <011> poling | 527-1,100 | $\gamma_{13}\ \gamma_{23}\ \gamma_{33}$ | 87 | 300 | mm2 | 1.55 | biaxial |
| PIN-PMN-PT* <011> poling | 500-1,030 | $\gamma_{13}\ \gamma_{23}\ \gamma_{33}$ | 95 | 315 | mm2 | 1.55 | biaxial |

*This invention

Figure 1B:
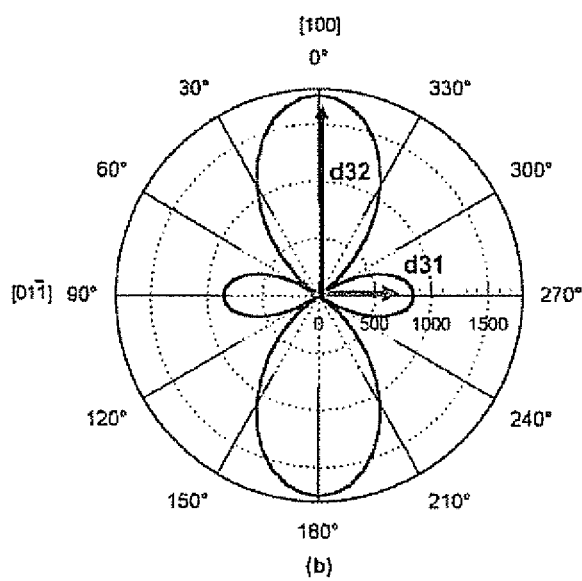
FIG. 1B is a 2D plot of the X-Y cut section of the 3D plot in FIG. 1A noting the unique anisotropic property-positive $d_{31}$ and negative $d_{32}$, whereas both $d_{31}$ and $d_{32}$ are negative for <001> poling and <111> poling.
Figure 2A:
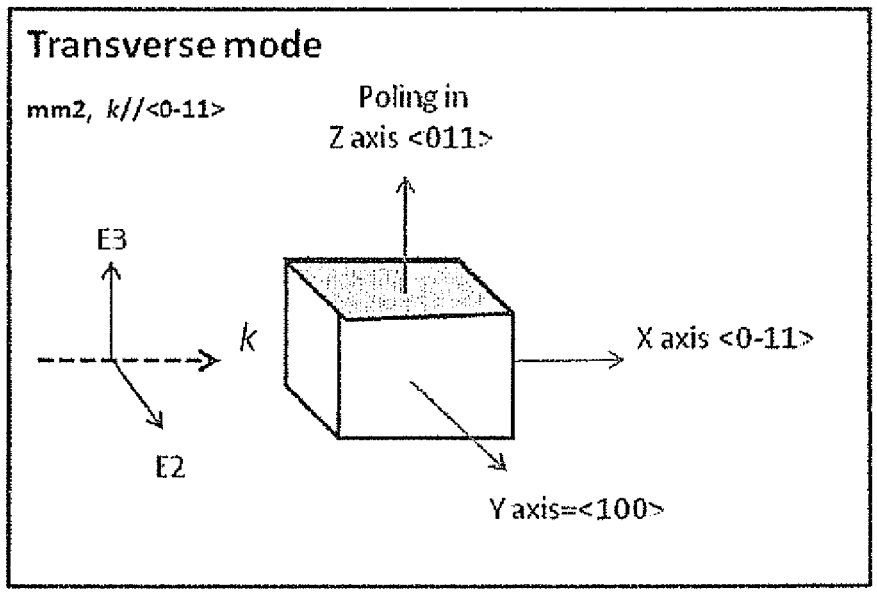
FIG. 2A is a transverse mode E-O crystal element with <011> polarization.
Figure 2B:
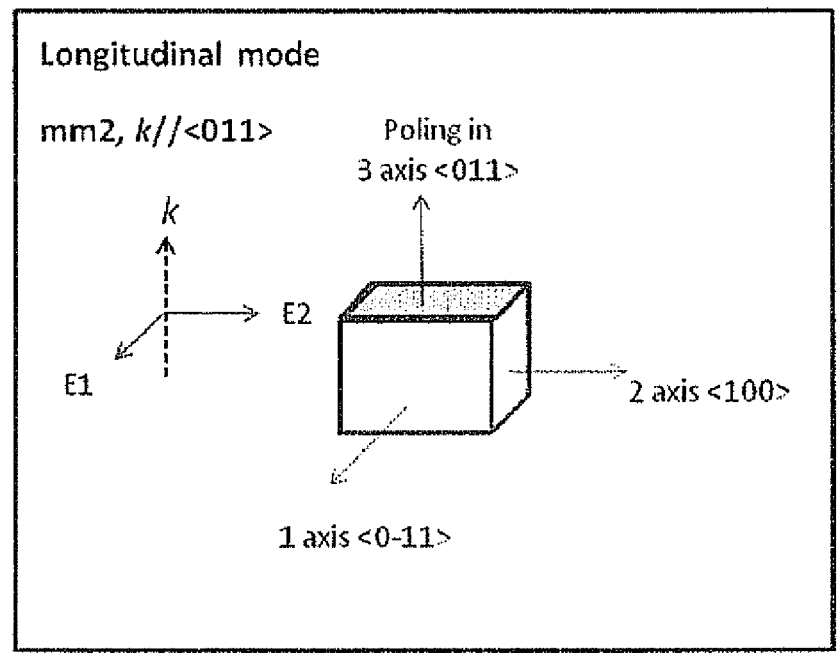
FIG. 2B is a longitudinal mode E-O crystal element with <011> polarization.

Referring now to FIGS. 1-1B, Applicant has noted the unique property that the <011> poled PMN-PT and/or PZN-PT based crystals show a mm2 orthorhombic symmetry of physical properties and especially give a positive piezoelectric coefficient $d_{31}$ (+700 pC/N) and a negative $d_{32}$ (−1600 pC/N) all while $d_{33}$ still about 1000 pC/N, noting the absolute difference in coefficient is very large.

Referring further now to FIGS. 2A-6B, this invention is made based on our now-recognized concepts: (1) large electrical strain changes of the ferroelectric crystals induce large changes of the respondent optical index, (2) the anisotropic of strain changes significantly impact on the optical index changes of the crystals, particularly for an optical biaxial crystals of PMN-PT based solid solutions, (3) <011> poled crystals having stable nano-multi-domain structure leading to less light scattering by domain walls or single domain status if the crystal composition closed to the morphotropic phase boundary (MPB), and (4) a biaxial optical crystal is preferred as an incident polarized light to the crystal should be divided into two components of polarized light perpendicular each other. It is expected that higher anisotropic piezoelectric response in the crystal offers The E-O single crystal materials can be PMN-PT (Lead Magnesium Niobate-Lead Titanate) or PIN-PMN-PT (Lead Indium niobate-Lead magnesium Niobate-Lead Titanate) or PZN-PT (Lead Zinc Niobate-Lead Titanate) and/or doped crystals of the above.

Experimental Sample 1

A transverse mode E-O crystal element with composition: 67.5% PMN-32.5% PT single crystal element. The cut direction, poling direction and configuration of incident light and crystallographic orientation are showing in FIG. 2A. The test results as follows:

Data Tested at Different Temperatures

| | −21° C. | −8° C. | 20° C. | 80° C. |
|---|---|---|---|---|
| $\gamma^T_c$ | 395 | 436 | 530 | 1160 |
| $V^T_\pi$ l/d = 1 | | 119 | 87 | 37.5 |

$\gamma^T_c$: effective transverse linear E-O coefficient
$V^T_\pi$: halfwave voltage Normalized to l/d = 1

Experimental Sample 1

A longitudinal mode E-O crystal element with composition: 67.5% PMN-32.5% PT single crystal element. The cut direction, poling direction and configuration of incident light and crystallographic orientation are showing in FIG. 2B. The test results as follows: the effective longitudinal linear E-O coefficient $\gamma^l_c$ as high as 450 pm/V at 20 C with very low half-wave voltage $V^l_\pi$ less than 300V.

Experimental Sample 3

A longitudinal mode E-O crystal element with composition: 24% PIN52.4% PMN-23.6% PT single crystal element. The cut direction, poling direction and configuration of incident light and crystallographic orientation are showing in FIG. 3. The test results as follows: The effective longitudinal linear E-O coefficient $\gamma^l_c$ as high as 500 pm/V at 20 C with very low half-wave voltage $V^l_\pi$ less than 315V.

Experimental Sample 4

A transverse mode E-O crystal element with composition: 24% PIN52.4% PMN-23.6% PT single crystal element. The cut direction, poling direction and configuration of incident light and crystallographic orientation are showing in FIG. 4. The test results as follows: The effective transverse linear E-O coefficient $\gamma^T_c$ over 527 pm/V at 20 C with very low half-wave voltage $V^T_\pi$ less than 95V.

Figure 5:
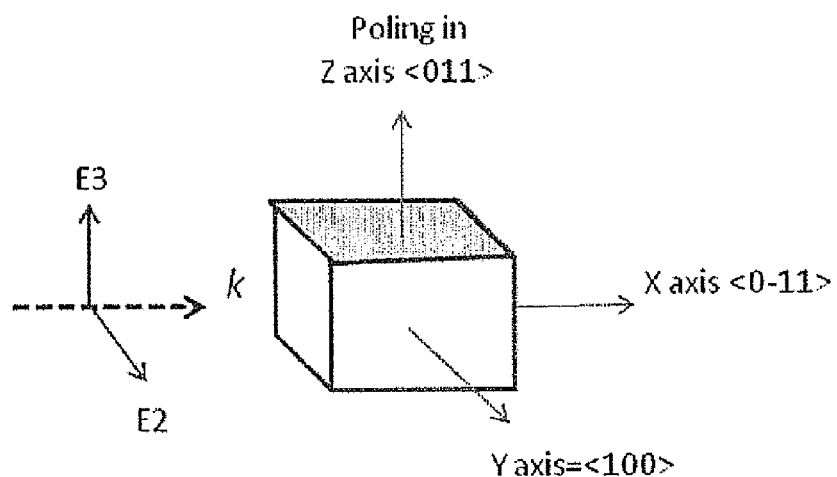
FIG. 5 is an E-O crystal wafer, diced, polished, and optically finished into an E-O crystal element (cell), in transverse mode.
Figure 5A:
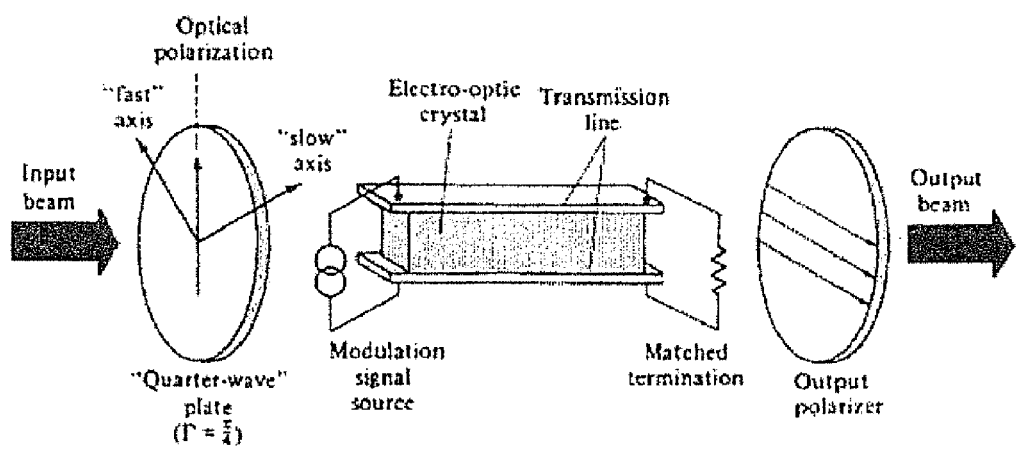
FIG. 5A is a traveling-wave E-O modulator using <011> poled E-O crystal element of a transverse mode, for example for use in communication systems.

Referring specifically now to FIG. 5A an electro optical system with transverse mode crystal may contain an electro optical crystal spacing transmission lines, for example in a communication system, having matched termination, as shown, and operatively linked with a modulation signal source, as also shown. Additionally included is a polarization feature (here a quarter wave plate), and an output polarizer. Other supportive structures will be understood by those of skill in the respective arts having studied the proposed invention. As a result, the present invention provides an electro optical system, for example, an optical imaging system, a laser system, a communication system, or otherwise as will be understood by those of skill in the art having studied the proposed disclosure.

Figure 6A:
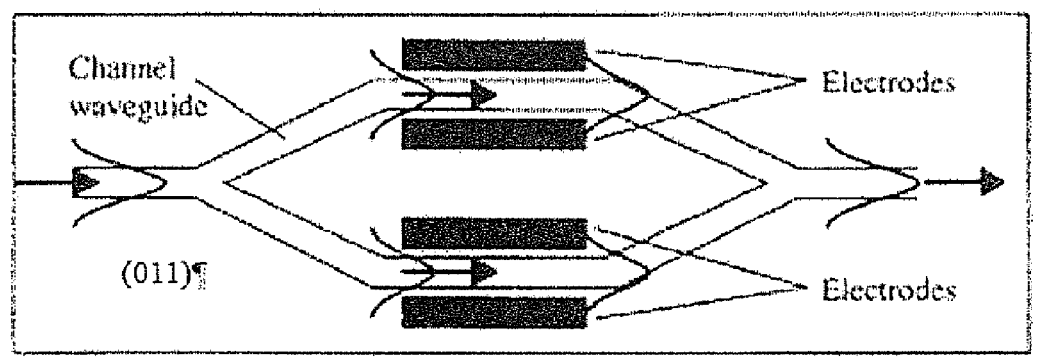
FIG. 6A is an exemplary E-O modulator for laser beams, schematic drawing along a top view of a Mach-Zehnder interferometer modulator on (011) surface, with recombination with in-phase beams.
Figure 6B:
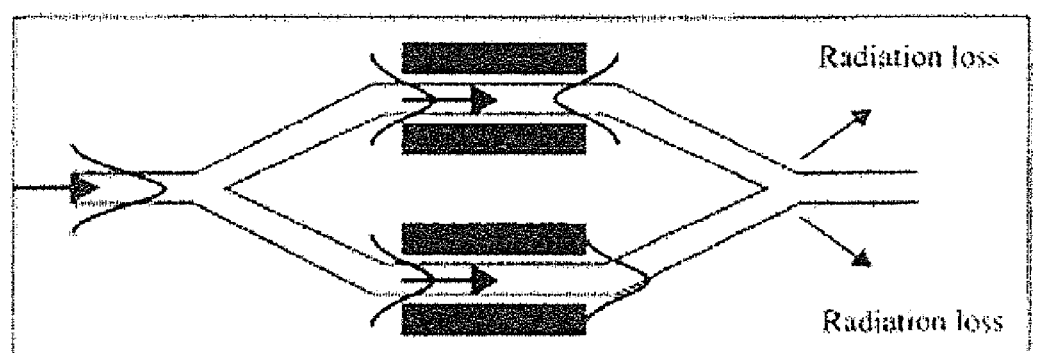
FIG. 6B is an exemplary E-O modulator for laser beams, schematic drawing along a top view of a Mach-Zehnder interferometer modulator on (011) surface, with recombination with off-phase beams.

Additionally referring now to FIGS. 6A and 6B, it will be understood that those of skill in the art will note laser switching system for optical fibers (fiber communications) electrodes and beam or channel waveguides and switches (with appropriate losses) may be employed with the present electro optical crystal element employed as a switch, coupling element, or other functional element in an a small crystal between either electrode, with the laser fiber linking to the small crystal, a laser system, or a communication system, or otherwise as will be understood by those of skill in the art having studied the proposed disclosure.

The present invention also provides the use of the disclosed E-O elements in commercial E-O crystal element applications containing a variety of the E-O crystal devices as a new generation of E-O crystal elements. It is especially applicable to E-O switching systems and methods, E-O phase modulation systems and methods, E-O amplitude modulation systems and methods, laser beam modulation and optical birefringence devices and related systems and methods, and the accompanying systems that include the same.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase.

Moreover, even if the provisions of 35 U.S.C. 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An communication system, said communication system including an electro-optical crystal element, said communication system, comprising:
    a longitudinal mode electro-optical crystal element produced by a method comprising the steps of:
        preparing a crystal element having a chemical composition represented by the chemical formula:

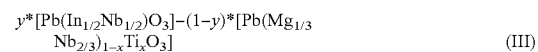
    $y*[Pb(In_{1/2}Nb_{1/2})O_3]-(1-y)*[Pb(Mg_{1/3}Nb_{2/3})_{1-x}Ti_xO_3]$      (III)

where x is defined as 0.0 to 0.35, y as 0.0 to 0.35
    slicing said crystal element to (011); and
    polarizing into mm2 symmetric structure by poling said crystal element in <011> direction under 2 times of coercive field ($E_c$) in a temperature range below 95° C.; and
    said longitudinal mode electro-optical crystal element including means for providing <011> polarization of longitudinal effective E-O coefficient $\gamma^l_c$ above 427 pm/V and $V^l_\pi$ less than 300 V at room temperature 20° C.

2. An communication system, said communication system including an electro-optical crystal element, said communication system, comprising:

a transverse mode electro-optical crystal element produced by a method comprising the steps of:
preparing a crystal element having a chemical composition represented by one of the chemical formulas:

$$Pb(Mg_{1/3}Nb_{2/3})_{1-x}Ti_xO_3 \text{ where } x \text{ is defined as 0.22 to 0.38} \quad (I)$$

or $$Pb(Zn_{1/3}Nb_{2/3})_{1-y}Ti_yO_3 \text{ where } y \text{ is defined as 0.04 to 0.11,} \quad (II)$$

wherein, all said crystal elements can be doped or co-doped with Lanthanum (La) up to 6% (wt %), Antimony (Sb), Tantalum (Ta) up to 8% (wt %), Indium (In) up to 31% (wt %), Zirconium (Zr) up to 5% (wt %) and at least one rare earth element from the group consisting of: Cerium (Ce), Erbium (Er), Terbium (Tb), Scandium (Sc), and Neodymium (Nd), up to 8% (wt %);
slicing said crystal element to (011); and
polarizing into a mm2-symmetric structure by poling said crystal element in <011> direction under 2 times of coercive field ($E_c$) in a temperature range below 95° C.; and
said transverse mode electro-optical crystal element including means for providing <011> polarization and giving the transverse effective E-O coefficient $\gamma^T_c$ above 500 pm/V and half-wave voltage $V^T_\pi$ less than 87.5 V (l/d=1) at room temperature 20° C.

3. An communication system, said communication system including an electro-optical crystal element, said communication system, comprising:
a transverse mode electro-optical crystal element produced by a method comprising the steps of:
preparing a crystal element having a chemical composition represented by the chemical formula:

$$y^*[Pb(In_{1/2}Nb_{1/2})O_3]-(1-y)^*[Pb(Mg_{1/3}Nb_{2/3})_{1-x}Ti_xO_3] \quad (III)$$

where x is defined as 0.0 to 0.35, y as 0.0 to 0.35
slicing said crystal element to (011);
polarizing into mm2 symmetric structure by poling said crystal element in <011> direction under 2 times of coercive field ($E_c$) in a temperature range below 95° C.;
said transverse mode electro-optical crystal element including means for providing <011> polarization and giving the transverse effective E-O coefficient $\gamma^T_c$ above 500 pm/V and half-wave voltage $V^T_\pi$ less than 12 V (l/d=7) at room temperature 20° C.

4. An communication system, said communication system including an electro-optical crystal element, said communication system, comprising:
a longitudinal mode electro-optical crystal element produced by a method comprising the steps of:
preparing a crystal element having a chemical composition represented by one of the chemical formulas:

$$Pb(Mg_{1/3}Nb_{2/3})_{1-x}Ti_xO_3 \text{ where } x \text{ is defined as 0.22 to 0.38} \quad (I)$$

or $$Pb(Zn_{1/3}Nb_{2/3})_{1-y}Ti_yO_3 \text{ where } y \text{ is defined as 0.04 to 0.11,} \quad (II)$$

wherein, all said crystal elements can be doped or co-doped with Lanthanum (La) up to 6% (wt %), Antimony (Sb), Tantalum (Ta) up to 8% (wt %), Indium (In) up to 31% (wt %), Zirconium (Zr) up to 5% (wt %) and at least one rare earth element from the group consisting of: Cerium (Ce), Erbium (Er), Terbium (Tb), Scandium (Sc), and Neodymium (Nd), up to 8% (wt %);
slicing said crystal element to (011); and
polarizing into a mm2-symmetric structure by poling said crystal element in <011> direction under 2 times of coercive field ($E_c$) in a temperature range below 95° C.; and
said longitudinal mode electro-optical crystal element including means for providing <011> polarization and giving the longitudinal effective E-O coefficient $\gamma^l_c$ more than 427 m/V and $V^l_\pi$ less than 300 V at room temperature 20° C.

5. A communication system, comprising:
a Mach-Zehnder-type interferometer modulator on an (011) surface of an electro-optical crystal element; and
said electro-optical crystal element produced by a method comprising the steps of:
preparing a crystal element having a chemical composition represented by one of the chemical formulas:

$$Pb(Mg_{1/3}Nb_{2/3})_{1-x}Ti_xO_3 \text{ where } x \text{ is defined as 0.22 to 0.38} \quad (I)$$

or $$Pb(Zn_{1/3}Nb_{2/3})_{1-y}Ti_yO_3 \text{ where } y \text{ is defined as 0.04 to 0.11,} \quad (II)$$

wherein, all said crystal elements can be doped or co-doped with Lanthanum (La) up to 6% (wt %), Antimony (Sb), Tantalum (Ta) up to 8% (wt %), Indium (In) up to 31% (wt %), Zirconium (Zr) up to 5% (wt %) and at least one rare earth element from the group consisting of: Cerium (Ce), Erbium (Er), Terbium (Tb), Scandium (Sc), and Neodymium (Nd), up to 8% (wt %);
slicing said crystal element to (011);
polarizing into a mm2-symmetric structure by poling said crystal element in <011> direction under 2 times of coercive field ($E_c$) in a temperature range below 95° C.;
providing a transverse mode said crystal element; and
said transverse mode crystal element providing <011> polarization and giving the transverse effective E-O coefficient $\gamma^T_c$ more than 527 pm/V and half-wave voltage $V^T_\pi$ less than 87.5 V (l/d=1) at room temperature 20° C.

6. A communication system, comprising:
a Mach-Zehnder-type interferometer modulator on an (011) surface of an electro-optical crystal element; and
said electro-optical crystal element produced by a method comprising the steps of:
preparing a crystal element having a chemical composition represented by one of the chemical formulas:

$$Pb(Mg_{1/3}Nb_{2/3})_{1-x}Ti_xO_3 \text{ where } x \text{ is defined as 022 to 0.38} \quad (I)$$

or $$Pb(Zn_{1/3}Nb_{2/3})_{1-y}Ti_yO_3 \text{ where } y \text{ is defined as 0.04 to 0.11,} \quad (II)$$

wherein, all said crystal elements can be doped or co-doped with Lanthanum (La) up to 6% (wt %), Antimony (Sb), Tantalum (Ta) up to 8% (wt %), Indium (In) up to 31% (wt %), Zirconium (Zr) up to 5% (wt %) and at least one rare earth element from the group consisting of: Cerium (Ce), Erbium (Er), Terbium (Tb), Scandium (Sc), and Neodymium (Nd), up to 8% (wt %);

slicing said crystal element to (011);

polarizing into a mm2-symmetric structure by poling said crystal element in <011> direction under 2 times of coercive field ($E_c$) in a temperature range below 95° C.;

providing a longitudinal mode said crystal element;

coating a transparent electrodes on said longitudinal mode crystal element; and said longitudinal mode crystal element providing <011> polarization of longitudinal effective E-O coefficient $\gamma^l_c$ more than 427 pm/V and $V^l_\pi$ less than 300 V at room temperature 20° C.

7. A communication system, comprising:

a Mach-Zehnder-type interferometer modulator on an (011) surface of an electro-optical crystal element; and said electro-optical crystal element produced by a method comprising the steps of:

preparing a crystal element having a chemical composition represented by the chemical formula:

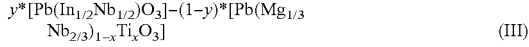 (III)

where x is defined as 0.0 to 0.35, y as 0.0 to 0.35 slicing said crystal element to (011);

polarizing into mm2 symmetric structure by poling said crystal element in <011> direction under 2 times of coercive field ($E_c$) in a temperature range below 95° C.;

providing a transverse mode said crystal element; and said transverse mode crystal element providing <011> polarization and giving the transverse effective E-O coefficient $\gamma^T_c$ above 500 pm/V and half-wave voltage $V^T_\pi$ less than 12 V (l/d=7) at room temperature 20° C.

8. A communication system, comprising:

a Mach-Zehnder-type interferometer modulator on an (011) surface of an electro-optical crystal element; and said electro-optical crystal element produced by a method comprising the steps of:

preparing a crystal element having a chemical composition represented by the chemical formula:

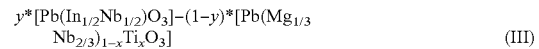 (III)

where x is defined as 0.0 to 0.35, y as 0.0 to 0.35 slicing said crystal element to (011);

polarizing into mm2 symmetric structure by poling said crystal element in <011> direction under 2 times of coercive field ($E_c$) in a temperature range below 95° C.;

providing a longitudinal mode said crystal element;

coating a transparent electrode on said longitudinal mode crystal element; and said longitudinal mode crystal element providing <011> polarization of longitudinal effective E-O coefficient $\gamma^l_c$ above 427 pm/V and $V^l_\pi$ less than 300 V at room temperature 20° C.

* * * * *